(12) United States Patent
Liess et al.

(10) Patent No.: US 6,759,671 B2
(45) Date of Patent: Jul. 6, 2004

(54) METHOD OF MEASURING THE MOVEMENT OF A MATERIAL SHEET AND OPTICAL SENSOR FOR PERFORMING THE METHOD

(75) Inventors: Martin Dieter Liess, Eindhoven (NL); Gillian Antoinette Mimnagh-Kelleher, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 35 days.

(21) Appl. No.: 10/169,314

(22) PCT Filed: Nov. 5, 2001

(86) PCT No.: PCT/EP01/12770

§ 371 (c)(1),
(2), (4) Date: Jul. 3, 2002

(87) PCT Pub. No.: WO02/37124

PCT Pub. Date: May 10, 2002

(65) Prior Publication Data

US 2003/0016365 A1 Jan. 23, 2003

(30) Foreign Application Priority Data

Nov. 6, 2000 (EP) .............................. 00203875

(51) Int. Cl.[7] .............................. G01N 21/86

(52) U.S. Cl. .............................. 250/559.32; 250/559.29

(58) Field of Search ...................... 250/559.32, 559.29, 250/559.4, 221, 222.1; 356/614, 637, 429

(56) References Cited

U.S. PATENT DOCUMENTS

| 4,733,609 A | * | 3/1988 | Goodwin et al. ........... 102/213 |
| 5,686,720 A | * | 11/1997 | Tullis ...................... 250/208.1 |
| 6,233,045 B1 | | 5/2001 | Suni et al. ................. 356/28.5 |

FOREIGN PATENT DOCUMENTS

| DE | 3730543 C1 | 4/1989 |
| FR | 2720839 | 6/1994 |

* cited by examiner

*Primary Examiner*—Que T. Le (57) ABSTRACT

Measurements on a sheet (12), for example measurement of the movement of the sheet in a printer, can be performed by directing a measuring beam (8) towards the sheet and utilizing the effects of self-mixing in a diode laser (2) and Doppler shift in the measuring beam caused by the movement. The measuring method and a dedicated, cheap and compact, sheet sensor (1) may be used for determining different parameters and in different sheet processing apparatus.

20 Claims, 8 Drawing Sheets

METHOD OF MEASURING THE MOVEMENT OF A MATERIAL SHEET AND OPTICAL SENSOR FOR PERFORMING THE METHOD

The invention relates to a method of measuring movement of a material sheet and a sheet sensor relative to each other along at least one measuring axis, which method comprises the steps of:

illuminating the sheet with a measuring laser beam for each measuring axis, and converting a selected portion of the measuring beam radiation reflected by the sheet into an electrical signal, which is representative of the movement along said measuring axis.

The invention also relates to a sheet sensor for performing this method and to sheet processing apparatus comprising such a sensor.

Such a method and sheet sensor can be used in an apparatus wherein a material sheet, for example a sheet of paper, is fed through the apparatus in order to undergo processing, for example printing of information or scanning of information printed on a sheet. Such an apparatus may be, for example a (colour) printer, a copier, a document scanner or a facsimile apparatus. A sheet sensor is understood to mean a device by means of which, for example, the velocity of movement of a sheet or the position of a specific area of this sheet can be measured, or the quality of a print can be monitored. In printers, copiers and facsimile apparatus one or more rollers are use to move a paper through the apparatus. Currently, paper movement control, also called paper feed control, in such apparatus is carried out by controlling the movement of a roller. Thereby it is assumed that the movement of the roller exactly determines movement of the paper sheet. However, in practice slippage between the sheet and the roller can not be excluded so that it is not assured the movement of the roller always represents the movement of the sheet. Moreover a fine control of the roller movement, needed for a fine control of the paper feed, requires a very precise control of the motor, which drives the roller. Such a precise control is expensive, which is prohibitive for mass applications. For example, for high-resolution printing such as in a next generation colour printer, the movement of the paper sheet has to be controlled and thus measured with a precision of about 10 $\mu$m. Even a very precise mechanical paper feed does not allow such fine control.

The paper feed control could be made more accurate and the requirements for the roller motor control could be lessened considerably by measuring the sheet movement by a beam of optical radiation, which is a contact-less measuring. Devices for optical measurements known so far are intended for small-scale applications and are quite expensive.

It is an object of the invention to provide a method as described in the opening paragraph, which can be carried out with simple means and shows a very high accuracy and liability. This method is characterized in that measuring beam radiation reflected back along the measuring beam and re-entering the laser cavity, which emits the measuring beam, is selected and in that changes in operation of the laser cavity, which are due to interference of the re-entering radiation and the optical wave in the laser cavity and are representative of the movement, are measured.

The new method uses the so-called self-mixing effect in a diode laser. This is the phenomenon that radiation emitted by a diode laser and re-entering the cavity of the diode laser induces a variation in the gain of the laser and thus in the radiation emitted by the laser. The sheet to be measured and the sheet sensor are arranged relative to each other such that the direction of movement has a component in the direction of the laser beam. Upon movement of the sheet relative to the sheet sensor, the radiation reflected and scattered by the sheet gets a frequency different from the frequency of the radiation illuminating the sheet, because of the Doppler effect. Part of the scattered light is focused on the diode laser by the same lens that focuses the illumination beam on the object. Because some of the scattered radiation enters the laser cavity through the laser mirror, interference of light takes place in the laser. This gives rise to fundamental changes in the properties of the laser and the emitted radiation. Parameters, which change due to the self-coupling effect, are the power, the frequency and the line width of the laser radiation and the laser threshold gain. The result of the interference in the laser cavity is a fluctuation of the values of these parameters with a frequency that is equal to the difference of the two radiation frequencies. This difference is proportional to the velocity of the sheet. Thus the velocity of the sheet and, by integrating over time, the displacement of the sheet can be determined by measuring the value of one of said parameters. This method can be carried out with only a few and simple components and does not require accurate alignment of these components.

The use of the self-mixing effect for measuring velocities of objects, or in general solids and fluids, is known per se. By way of example, reference is made to the article: "Small laser Doppler velocimeter based on the self-mixing effect in a diode laser" in Applied Optics, Vol. 27, No. 2, Jan. 15, 1988, pages 379–385, and the article: "Laser Doppler velocimeter based on the self-mixing effect in a fibre-coupled semiconductor laser: theory" in Applied Optics, Vol. 31, No. 8, Jun. 20, 1992, pages 3401–3408. However, up to now, use of the self-mixing effect for measuring the movement of a sheet in a direction at an acute angle with the laser beam has not been suggested. This new application is based on the recognition that a sheet sensor using the self-coupling effect can be made so small and cheap that it can be installed easily and without much additional cost in existing devices and apparatus.

In order to detect the direction of movement, i.e. to detect whether the sheet moves forward or backward along a measuring axis, the method may be characterized in that the direction of movement along said at least one measuring axes is detected by determining the shape of the signal which represents the variation in operation of the laser cavity.

This signal is an asymmetric signal and the asymmetry for a forward movement is different from the asymmetry for a backward movement.

Under circumstances, where it is difficult to determine the asymmetry of the self-mixing signal, preferably another method is used. This method is characterized in that the direction of movement along said at least one measuring axis is determined by supplying the laser cavity with a periodically varying electric current and comparing first and second measuring signals with each other, which first and second measuring signals are generated during alternating first half periods and second half periods, respectively.

The wavelength of the radiation emitted by a diode laser increases, and thus the frequency of this radiation decreases, with increasing temperature, thus with increasing current through the diode laser. A periodically varying current through the diode laser in combination with radiation from the sheet re-entering the laser cavity results in a number of radiation pulses per half period and thus in a corresponding number of pulses in the measured signal. If there is no relative movement of the sheet and the movement sensor, the number of signal pulses is the same in each half period. If the device and the object move relative to each other, the number of pulses in one half period is larger or smaller than the number of pulses in the next half period, depending on the direction of movement. By comparing the signal measured during one half period with the signal measured during the next half period, not only the velocity of the movement but also the direction of the movement can be determined.

This method may be further characterized in that the first and second measuring signals are subtracted from each other.

The changes in the operation of the laser cavity can be determined in several ways.

A first embodiment of the method is characterized in that the impedance of the diode laser cavity is measured.

The impedance of the laser diode is one of the parameters, which change due to the interference effect and is a function of the relative movement of the sheet and the sheet sensor. This impedance can be determined by measuring the voltage across the diode laser and dividing the measured voltage value by the known value of the electric current sent through the diode laser.

A preferred embodiment of the method is characterized in that the intensity of the laser radiation is measured.

Measuring the intensity of the laser radiation is the simplest way of determining the changes in the laser cavity, because this can be done with a simple photo diode.

To increase the accuracy and reliability of the method, this method may be characterized by the further step of detecting the state of focus of the measuring beam relative to the sheet.

The improved method may be further characterized in that the state of focus is detected by determining the amplitude of the changes in the diode laser cavity.

Alternatively, the improved method may be characterized in that the state of focus is detected by imparting a state of focus-dependent shape to a focus detection composed of measuring beam radiation reflected by the sheet and determining this shape by combining output signals of detector elements of a composed radiation-sensitive detector arranged in the path of the focus detection beam.

According to a further aspect of the invention, the method with focus detection can be adapted in a simple way to a method for measuring the thickness of a sheet. The latter method is characterized in that a first optimum state of focus of the measuring beam, relative to the surface of a sheet transporting means, and a second optimum state of focus, relative to the sheet are determined and in that the thickness of the sheet is determined from the difference between the first and second optimum state of focus.

The invention also relates to a sheet sensor for performing measurements on a sheet including the measurement of the movement of a sheet, which sensor comprises at least one laser, having a laser cavity, for generating a measuring beam, optical means for converging the measuring beam to a measuring spot in the plane of the sheet and converting means for converting measuring beam radiation reflected by the sheet into an electrical signal. This sheet sensor is characterized in that the converting means are constituted by the combination of the laser cavity and measuring means for measuring changes in operation of the laser cavity, which are due to interference of reflected measuring beam radiation re-entering the laser cavity and the optical wave in this cavity.

This sheet sensor may be called a self-mixing sheet sensor.

A first embodiment of the sheet sensor is characterized in that the measuring means are means for measuring a variation of the impedance of the laser cavity.

A preferred embodiment of the sheet sensor is characterized in that the measuring means is a radiation detector for measuring radiation emitted by the laser.

The radiation detector may be arranged in such a way that it receives part of the radiation of the measuring beam.

This embodiment of the sheet sensor is, however, preferably characterized in that the radiation detector is arranged at the side of the laser cavity opposite the side where the measuring beam is emitted.

Generally, diode lasers are provided with a monitor diode at their rear side. Usually, such a monitor diode is used to stabilize the intensity of the laser beam emitted at the front side of the diode laser. According to the invention, the monitor diode is used to detect changes in the laser cavity, which are generated by radiation of the measuring beam re-entering the laser cavity.

With respect to the optical design, the most simple embodiment of a sheet sensor for determining the amount and direction of movement of a sheet along a measuring axis is characterized in that it comprises one diode laser and one measuring means for measuring changes in the diode laser cavity and in that the measuring means comprises electronic means for determining said amount and direction.

The electronic means are designed to allow determination of the direction of movement in the ways described herein above.

A sheet sensor for determining the amount and direction of movement of a sheet along a measuring axis with simplified electronic means is, characterized in that it comprises two sensor branches each having a branch axis and including a diode laser and measuring means for measuring changes in the diode laser cavity, the branch axes being arranged in a first plane through the measuring axis and at opposite angles with respect to a normal to the plane of movement of the sheet and situated in the first plane sheet.

As a sheet movement causes opposite effects in the two laser cavities, the amount of movement can be determined by subtracting the detector signals of the two branches from each other, whilst the direction of movement can be determined by comparing the asymmetries of these signals.

An embodiment of the sheet sensor, which allows detection of an oblique movement of a sheet, is characterized in that it comprises two sensor branches, each having a branch axis and including a diode laser and measuring means for measuring changes in the diode laser cavity, the branch axes being shifted in a direction perpendicular to the required direction of movement of the sheet.

By means of these two sensor branches a difference in movement of the left-hand side and the right-hand side of the sheet can be detected. If such difference occurs the sheet movement can be corrected by signals supplied by this embodiment of the sheet sensor An embodiment of the sheet sensor suitable for detecting the state of the measuring beam relative to a sheet to be measured is characterized in that it comprises electronic means for determining the amplitude of changes in the laser cavity, which amplitude represents the state of focus.

In this embodiment of the sheet sensor no additional optical means are needed to measure the state of focus of the measuring beam.

An alternative embodiment of the sheet sensor for detecting the state of focus of the measuring beam relative to the sheet to be measured is characterized in that it comprises a separate, multiple element, detector and optical means for imparting a focus dependent change in the shape of a focus detection beam incident on this detector and composed of measuring beam radiation In this embodiment of the sheet sensor the state of focus can be measured with simple optical means and without complicated electronics.

The latter two embodiments of the sheet sensor may be further characterized in that it comprises an actuator for setting the position, along the axis of the measuring beam, of a focussing lens arranged in the path of this beam and a focus controller for controlling the actuator in dependency of the detected state of focus.

By means of this measure the focus of the measuring beam relative to the sheet can be kept constant which allows an improved measurement.

The sheet sensor may be adapted such that it allows monitoring of line wise printed ink dots during a print process. This sheet sensor is characterized in that it comprises three sensor branches, each including a diode laser and measuring means for measuring changes in the diode laser cavity, the sensor branches being arranged in series along a line parallel to a printing line.

The sheet sensor may be composed of separate, stand-alone, components so that empty spaces in existing apparatus can be used to accommodate the sensor. Form a manufacturing point of view the sensor is preferably characterized in that it comprises a module having a transparent window and including at least one diode laser and an associated photodiode and a lens arranged between the diode laser and the window, the diode laser being arranged eccentrically with respect to the lens.

Such a module can be made compact so that it can easily build in. The lens may be a rotationally symmetric lens or may have another shape. Due to the eccentric position of the laser with respect to the lens element, it is ensured that the measuring beam is incident on the window of the module at an acute angle so that this beam has a component along the measuring axis. For the following explanation, the term optical axis is introduced, which is understood to mean the symmetry axis of the lens, or the module, which axis is perpendicular to the window of the module.

A sheet sensor suitable for, for example, measuring oblique movement of the sheet or for both measuring a sheet movement and monitoring print quality, is characterized in that it comprises two diode lasers and at least one photo diode.

As will be explained later on, this device and other devices utilizing two or more measuring beams may be provided with a separate detector for each measuring beam. However, it is also possible to use one and the same detector for all measuring beams if time-sharing is used.

In the module a diode laser of the type VCSEL (vertical cavity surface emitting laser) may be used. Such a laser emits radiation in the vertical direction, which makes it suitable for the present module. However, currently such a laser is quite costly, it is not very suitable for consumer mass products.

For this reason, preference is given to an embodiment of the module which is characterized in that each diode laser is a horizontal emitting laser and in that the device comprises, for each diode laser, a reflecting member reflecting the beam from the associated diode laser to the window.

Horizontal emitting diode lasers are the most commonly used lasers and are much cheaper than a VCSEL. Providing the device with a reflecting member adds little to the costs of this device.

An embodiment of the module, which can be manufactured relatively easily and at low cost, is characterized in that it is composed of a base plate on which the at least one diode laser and associated detector are mounted, a cap member fixed to the base plate and comprising the window and accommodating the lens.

This embodiment is composed of only three portions, which can be assembled easily and without severe alignment requirements.

An embodiment of the module, which is even easier to manufacture, is characterized in that the lens is integrated in the cap member having an internal surface which is curved towards the base plate.

This embodiment is composed of only two portions.

These embodiments are preferably further characterized in that the base plate, the cap member and the lens are made of a plastic material.

Components made of such a material may be cheap and low weight and thus are suitable for consumer products. Only the material of the lens should be transparent and have some optical quality.

An alternative embodiment of the module, i.e. a module without a lens, is characterized in that each diode laser is coupled to the entrance side of a separate light guide, the exit side of which is positioned at the window of the sensor.

In this embodiment, the radiation of an illumination beam is well isolated from its surroundings so that cross talk between the movements along different axes is eliminated or strongly reduced.

This embodiment is preferably characterized in that the light guides are optical fibres.

Optical fibres are flexible, have a small cross-section and show little attenuation per length unit and thus allow location of the window of the device at a larger distance from the diode lasers and the detectors.

The invention also relates to an apparatus for processing a material sheet and comprising a sheet transport means and a sheet transport measuring means for controlling the sheet transport. This apparatus is characterized in that the sheet transport measuring means comprises a sheet sensor as described herein above.

By introducing the sheet sensor in an apparatus the performance of this apparatus is improved and the apparatus is distinguished from conventional apparatus. As will be explained in the following the term processing should be interpreted broadly. Embodiments of the apparatus are described in claims 31–34.

These and other aspects of the invention are apparent from and will be elucidated, by way of non-limitative example, with reference to the embodiments described hereinafter. In the drawings.

Figure 1:
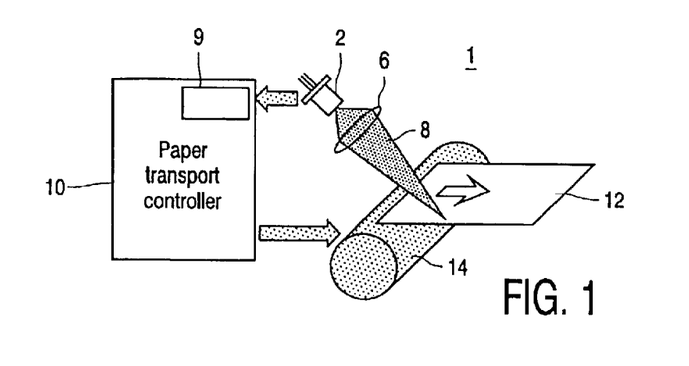
FIG. 1 shows a first embodiment of the self-mixing sheet sensor.

FIG. 1 shows a first and most simple embodiment of the self-mixing sheet sensor 1. This sensor comprises a diode laser, which may form part of a laser/diode unit 2, i.e. a unit comprising a diode laser and a detector in the form of a photo diode. Instead of such a unit also a separate diode laser and a separate photo diode may be used. The sensor further comprises a lens 6, which converges radiation emitted by the diode laser as a measuring beam 8 on a sheet 12 of, for example paper, which movement has to be controlled. This sheet is transported by means of a roller 14. The laser/diode unit an the lens may be accommodated in an optical module, which housing is provided with a window for the measuring beam. The shet then moves across this window.

If a paper sheet is present in the path of the measuring beam 8, for example at the location of said window, this sheet reflects and scatters the beam 8. A part of the radiation of beam 8 is scattered along itself and this part is converged by the lens 6 on the emitting surface of the diode laser and re-enters the cavity of this laser. As will be explained hereinafter, the radiation returning in the cavity induces changes in this cavity, which results in, inter alia, a change of the intensity of the laser radiation emitted by the diode laser. This change can be detected by means of a photo diode, which converts the radiation variation into an electric signal, and an electronic circuit 9 for processing this signal. The circuit 9 forms part of a paper transport controller 10, that controls the rotation of the roller 14 and thus the movement of the sheet 12

Figure 2:
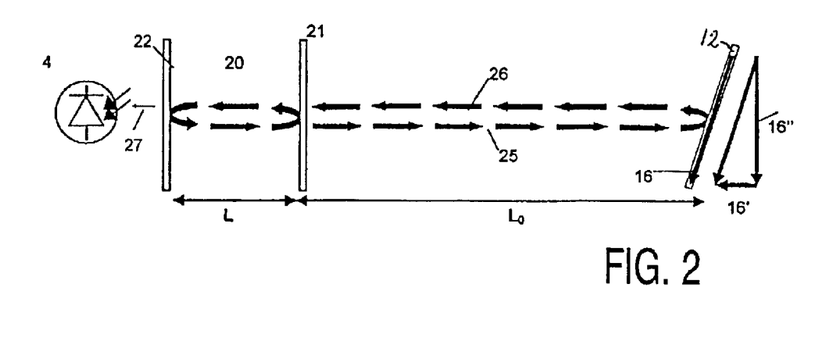
FIG. 2 illustrates the principle of the measuring method of this sensor.

FIG. 2 shows the principle of the sheet sensor and the method of measuring according to the present invention. In this FIG., the diode laser 3 is schematically represented by its cavity 20 and its front and rear facets, or laser mirrors, 21 and 22, respectively. The cavity has a length L. The space between the sheet 12 and the front facet 21 forms an external cavity, which has a length $L_0$. The laser beam emitted through the front facet, i.e. the illumination beam, is denoted by the reference numeral 25 and the radiation reflected by the sheet in the direction of the front facet is denoted by reference numeral 26. Part of the radiation generated in the laser cavity passes through the rear facet and is captured by the photo diode 4.

If the sheet 12 moves in the direction of the illumination beam 25, the reflected radiation 26 undergoes a Doppler shift. This means that the frequency of this radiation changes or that a frequency shift occurs. This frequency shift is dependent on the velocity with which the sheet moves and is of the order of a few kHz to MHz. The frequency-shifted radiation re-entering the laser cavity interferes with the optical wave, i.e. the radiation, generated in this cavity 20. This means that a self-mixing effect occurs in this cavity. Dependent on the amount of phase shift between the optical wave and the radiation re-entering the cavity, this interference will be constructive or negative, i.e. the intensity of the laser radiation is increased or decreased periodically. The frequency of the laser radiation modulation generated in this way is exactly equal to the difference between the frequency of the optical wave in the cavity and that of Doppler-shifted radiation re-entering the cavity. The frequency difference is of the order of a few kHz to MHz and thus easy to detect. The combination of the self-mixing effect and the Doppler shift causes a variation in the behaviour of the laser cavity, i.e. especially its gain, or light amplification, varies.

Figure 3A:
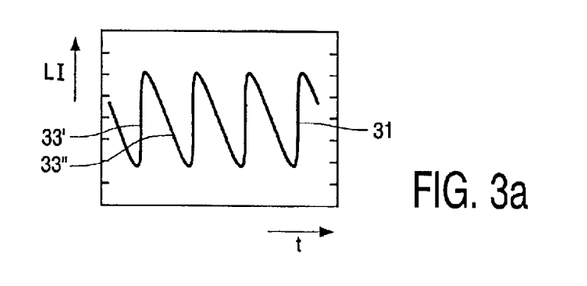
FIG. 3 shows the variation of the optical frequency and of the gain of the laser cavity as a function of the movement of the sheet.

FIG. 3a shows the variation of the laser beam intensity LI as a function of time t in case the movement of the sheet has a component in the direction of the chief ray of the laser beam towards the diode laser. Both LI ant t are in arbitrary units. As the variation of the laser intensity is proportional to the variation of the laser gain g, which is determined by the variation of the frequency v, and as the time axis can be re-scaled in an axis which represents the distance $L_0$ between the sheet to the diode laser, the graph 31 of FIG. 3a is similar to a graph representing the variation in the laser gain as a function of the distance $L_0$ The gain variation $\Delta g$ as a function of the velocity v of the object is given by the following equation:

$$\Delta g = -\frac{K}{L} \cdot \cos \cdot \left\{ \frac{4\pi \cdot v \cdot v \cdot t}{c} + \frac{4\pi \cdot L_0 \cdot t}{c} \right\}$$

In this equation:
K is the coupling coefficient to the external cavity; it is indicative of the quantity of radiation coupled out of the laser cavity;
ν is the frequency of the laser radiation;
v is the velocity of the sheet in the direction of the illumination beam
t is the moment of time, and
c is the light velocity.

The equation can be derived from the theory on the self-mixing effect disclosed in the two articles mentioned herein above. The sheet is moved in its own plane, as is indicated by the arrow 16 in FIG. 2. Because the Doppler shift occurs only for a sheet movement in the direction of the beam, this movement 16 should be such that it has a component 16' in this direction. Thereby, it becomes possible to measure the movement in an XZ plane, i.e. the plane of drawing of FIG. 2 which movement can be called the X movement. FIG. 2 shows that the sheet has a skew position with respect to the rest of the system. In practice, and as shown in FIG. 2, usually the measuring beam is a skew beam and the movement of the sheet will take place in an XY-plane. The Y-direction is perpendicular to the plane of the drawing in FIG. 2. If necessary the movement in this direction can be measured by a second measuring beam, emitted by a second diode laser, and scattered light of which is captured by a second photo diode associated with the second diode laser.

The measuring method requires only a small Doppler shift, for example in terms of wavelength, a shift of the order of $1,5 \cdot 10^{-16}$ m, which corresponds to a Doppler frequency shift of the order of 100 kHz for a laser wavelength of 680 nm.

Measuring the variation of the laser cavity gain caused by the object movement by measuring the intensity of the radiation at the rear laser facet by a monitor diode is the simplest, and thus the most attractive way. Conventionally, this diode is used for keeping the intensity of the laser radiation constant, but now it is also used for measuring the movement of the object.

Figure 4:
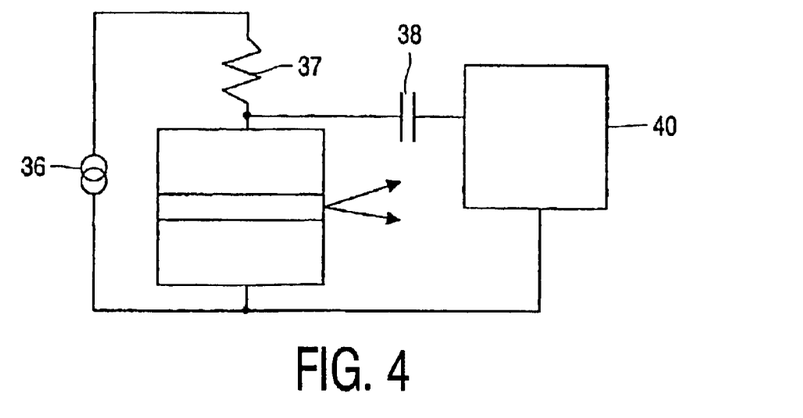
FIG. 4 illustrates a method of measuring this variation.

Another method of measuring the gain variation, and thus the movement of the sheet, makes use of the fact that the intensity of the laser radiation is proportional to the number of electrons in the conduction band in the junction of the laser. This number in turn is inversely proportional to the resistance of the junction. By measuring this resistance, the movement of the object can be determined. An embodiment of this measuring method is illustrated in FIG. 4. In this Figure, the active layer of the diode laser is denoted by the reference numeral 35 and the current source for supplying this laser is denoted by reference numeral 36. The voltage across the diode laser is supplied to an electronic circuit 40 via a capacitor 38. This voltage, which is normalized with the current through the laser, is proportional to the resistance, or impedance, of the laser cavity. The inductance 37 in series with the diode laser forms high impedance for the signal across the diode laser.

Besides the velocity of the sheet movement also the amount of movement, i.e. the sheet position, can be determined, by integrating the measured velocity with respect to time. For such integration information about the direction of movement is needed, i.e. it has to be determined whether the sheet moves forward or backward along an axis of measurement. The number of periods within a time interval of the signal 31 obtained by the sensor embodiment of FIG. 1 provides information about the velocity of the movement, but no information about the direction of movement. However, when using this embodiment the information about the direction can be derived from the paper transport controller 10. In this controller, which controls the sheet feed motor driving the roller 14, the direction information is available.

Figure 3B:
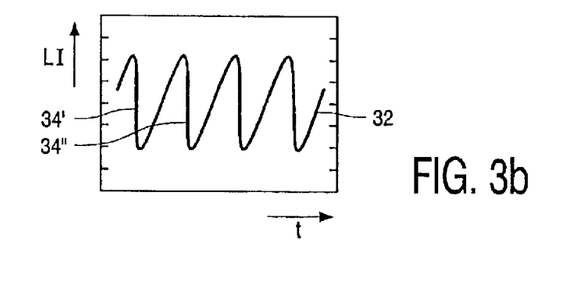

According to a further aspect of the invention, the direction of movement can be detected by determining the shape of the signal resulting from the self-mixing effect. As shown by graph 31 in FIG. 3a, this signal is an asymmetric signal. The graph 31 represents the situation where the sheet movement has a component towards the laser. The rising slope 33' of the graph 31 is steeper than the falling slope 33". As described in the above-mentioned article in Applied Optics, Vol. 31, No.8, Jun. 20, 1992, pages 3401–3408, the asymmetry is reversed for a movement of the object away from the laser. This is illustrated by graph 32 in FIG. 3b, which represents the situation that the sheet movement has a component away from the diode laser. The falling slope 34" of graph 32 is steeper than its rising slope 34'. By determining the type of asymmetry of the self-mixing signal, for example by comparing it with a reference, the direction of movement of the sheet can be ascertained.

Figure 5:
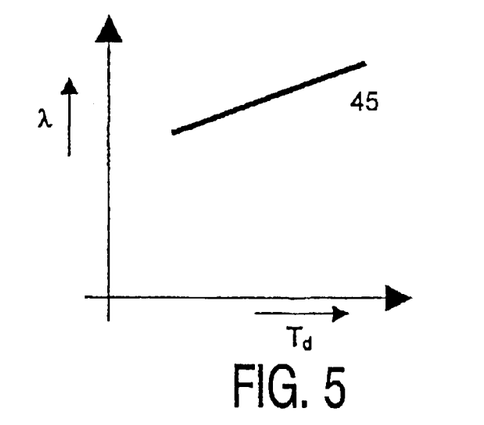
FIG. 5 shows the variation of laser wavelength as a function of the temperature of the laser with optical feedback.

FIG. 5 shows an embodiment 50 of the sheet sensor wherein this method of direction determination is used. This embodiment differs from that of FIG. 1 in that the electronic circuit 9

Under certain circumstances, for example for a smaller reflection coefficient of the object or a larger distance between the object and the diode laser, it may become difficult to determine the shape or asymmetry of the self-mixing signal. A preferred, method of determining the direction of movement uses the fact that the wavelength λ of the laser radiation is dependent on the temperature of, and thus the current through, the diode laser. If, for example, the temperature of the diode laser increases, the length of the laser cavity increases and the wavelength of the radiation that is amplified increases. Curve 45 of FIG. 5 shows the temperature ($T_d$) dependency of the wavelength λ of the emitted radiation. In this Figure, both the horizontal axis, $T_d$, and the vertical axis, λ, are in arbitrary units.

Figure 6:
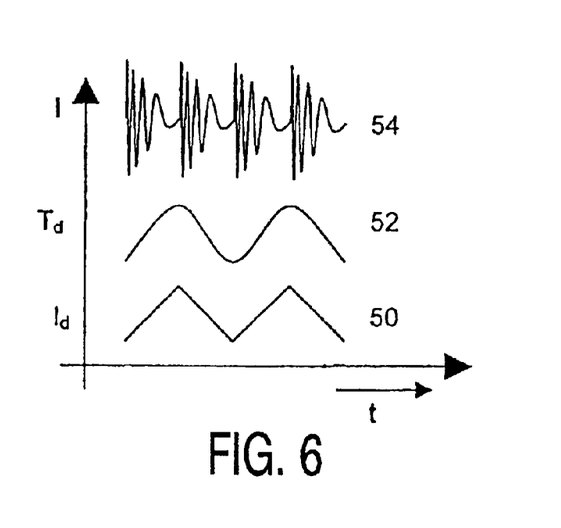
FIG. 6 shows the effect of the use of a periodically varying drive current for a laser.

If, as is shown in FIG. 6, a periodic drive current $I_d$, represented by the graph 50, is supplied to the diode laser, the temperature $T_d$ of the diode laser rises and falls periodically, as shown in graph 52. This results in a standing optical wave in the laser cavity which has a periodically varying frequency and thus a continuously varying phase shift with respect to the radiation reflected by the sheet and re-entering the cavity with a certain time delay. In every half period of the drive current, there are now successive time segments wherein the diode laser gain is higher and lower, depending on the phase relation of the wave in the cavity and the reflected radiation re-entering the cavity. This results in a time-dependent intensity variation (I) of the emitted radiation as shown in graph 54 of FIG. 6. This graph represents the situation for a stationary, or non-moving, sheet. The number of pulses in a first half period ½p(a) is equal to the number of pulses in a second half period ½p(b).

A movement of the sheet causes a Doppler shift of the radiation re-entering the laser cavity, i.e. this frequency increases or decreases dependent on the direction of movement. A movement of the object in one direction, the forward direction, causes a decrease of the wavelength of the re-entering radiation, and a movement in the opposite direction causes an increase in the wavelength of this radiation. The effect of the periodic frequency modulation of the optical wave in the laser cavity is that, in case the Doppler shift has the same sign as the frequency modulation in the laser cavity, the effect of Doppler-shifted radiation re-entering the cavity is different from the effect this radiation has in case said frequency modulation and Doppler shift have opposite signs. If the two frequency shifts have the same sign, the phase difference between the wave and the re-entering radiation changes at a slow rate, and the frequency of the resulting modulation of the laser radiation is lower. If the two frequency shifts have opposite signs, the phase difference between the wave and the radiation changes at a faster rate, and the frequency of the resulting modulation of the laser radiation is higher. During a first half period ½p(a) of the driving laser current, the wavelength of the generated laser radiation increases. In the case of a backward moving object, the wavelength of the re-entering radiation also increases, so that the difference between the frequencies of the wave in the cavity and that of the radiation re-entering this cavity is lower. Thus the number of time segments during which the wavelength of re-entering radiation is adapted to the wavelength of the generated radiation is smaller than in the case of absence of electrical modulation of the emitted laser radiation. This means that, if the sheet moves in the backward direction, the number of pulses in the first half period is smaller than if no modulation would be applied. In the second half period ½p(b), wherein the laser temperature and the wavelength of the generated radiation decrease, the number of time segments wherein the wavelength of the re-entering radiation is adapted to that of the generated radiation increases. Thus, for a backward moving sheet, the number of pulses in the first half period is smaller than the number of pulses in the second half period. This is illustrated in graph 58 of FIG. 7, which graph shows the intensity $I_b$ of the laser radiation emitted if the sheet moves in the backward direction. Comparing this graph with graph 54 of FIG. 6 shows that the number of pulses in the first half period has decreased and the number of pulses in the second half period has increased.

Figure 7:
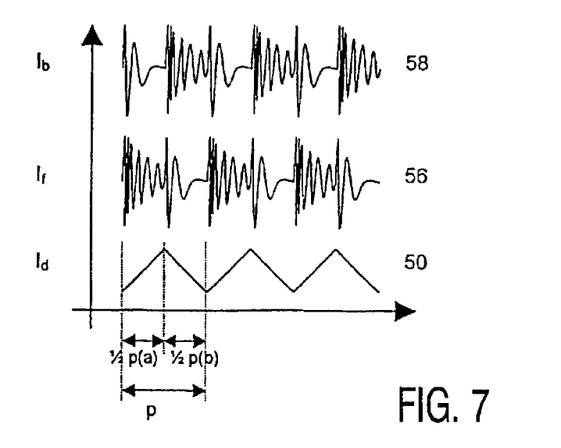
FIG. 7 illustrates a method of detecting the direction of movement.

It will be clear from the above reasoning that if the sheet movement has a component in the forward direction, in which the wavelength of radiation scattered by the sheet and re-entering the laser cavity decreases due to the Doppler effect, the number of pulses in a first half period ½p(a) is larger than the number of pulses in a second half period ½p(b). This can be verified by comparing graph 56 of FIG. 7, representing the intensity $I_f$ of the radiation emitted in the case of a sheet movement with a component in the forward direction with graph 58, which represents the intensity $I_b$ in the case of a sheet movement with a component in the backward direction. In an electronic processing circuit, the number of photo diode signal pulses counted during the second half period ½p(b) is subtracted from the number of pulses counted during the first half periods ½p(a). If the resulting signal is zero, the sheet is stationary. If the resulting signal is positive, the sheet moves in the forward direction and if this signal is negative, the sheet moves in the backward direction. The resulting number of pulses is proportional to the velocity of the movement in the forward and backward directions, respectively.

Under certain circumstances, for example if the optical path length between the laser and the sheet is relatively small and the frequency and amplitude of the electrical modulation are relatively small, whereas the movement to be detected is relatively fast, it may occur that the number of pulses generated by the Doppler effect is higher than the number of pulses generated by the electrical modulation. In such situations the direction of movement can still be detected by comparing the number of pulses during a first half period with the number of pulses during a second half period. However, the velocity is then not proportional to the difference of these two numbers. In order to determine the velocity in such situations, the said two numbers should be averaged and a constant value should be subtracted from the result. The number obtained in this way is a measure for the velocity. A person skilled in the art can easily design an electronic circuit for carrying out this calculation.

Instead of the triangular shaped drive current Id used in the embodiment described with reference to FIGS. 5 and 6, also a drive current of another shape, such as rectangular shape, may be used.

The method of measuring the velocity and the direction of the sheet movement described above can also be used if the gain variation is determined by measuring the variation of the resistance of the diode laser cavity.

Figure 8:
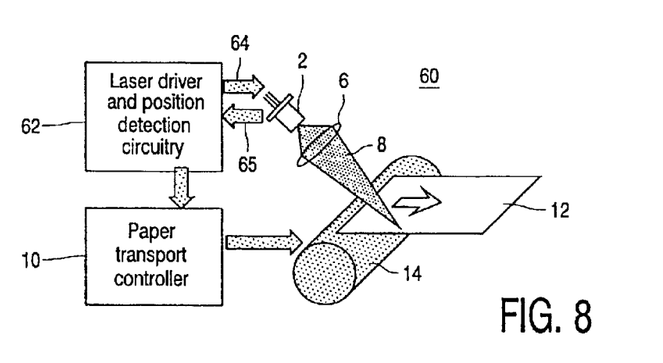
FIG. 8 shows an embodiment of the sheet sensor, which uses this method.

FIG. 8 shows an embodiment 60 of the sheet sensor wherein the method of direction determination by means of detecting the kind of asymmetry in the detector signal or by means of comparing the number of pulses in successive half periods, as described herein above is used. This embodiment differs from that of FIG. 1 in that a laser driver and sheet position detection circuit 62 has replaced the electronic signal processing circuit 9. The circuit 62 supplies driving pulses to the diode laser, as indicated by the arrow 64 and processes the signal from the detector, denoted by arrow 65, to a sheet position signal. The latter signal is obtained by integrating the detector signal with respect to time thereby using the information about the movement direction derived from the detector signal in one of the two ways described herein above.

Figure 9:
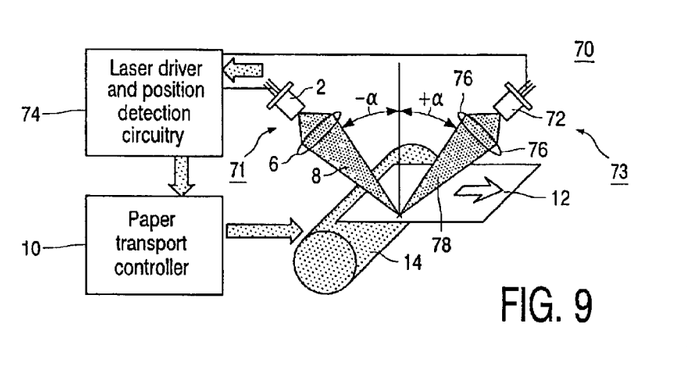
FIG. 9 shows a sheet sensor with two sensor branches.

Providing the sheet sensor with additional hardware allows detection of the direction of the sheet movement with simpler electronics and software. FIG. 9 shows an embodiment 70 of such a sheet sensor. In addition to the first sensor branch 71 comprising the laser/diode unit 2 and the first lens 6, by means of which a first measuring beam 8 is formed and converged in the plane of the sheet 12, this sensor comprises a second sensor branch comprising a laser/diode unit 72 and a second lens 76, by means of which a second measuring beam is formed and converged in the plane of the sheet 12. The chief rays of the measuring beams 8 and 78 are at opposite and, for example, equal angles $-\alpha$ and $+\alpha$ with the normal 77 to the plane of the sheet. For example $\alpha=45°$. It will be clear that if for one sensor branch the sheet movement component along the measuring beam axis is in the forward direction, for the other sensor branch this movement component is in the backward direction. This means that the frequency of the radiation re-entering the laser cavity of the one branch increases, whereas the frequency of the radiation re-entering the laser cavity of the second branch decreases. The signals from the detectors of the two branches have opposite asymmetries, similar to those shown in FIGS. 3a and 3b. These signals are supplied to an electronic circuit 74, which both delivers drive signals to the lasers and process the detector signals. By comparing the asymmetries of the detector signals the direction of movement along the measuring axis, also called the sign of the movement, can be determined. As for the two sensor branches a movement of the sheet has an opposite effect, the amount of movement can be determined by subtracting the detector signals of the two branches from each other. The amount signal thus obtained is twice the signal obtained when using one sensor branch.

Figure 10:
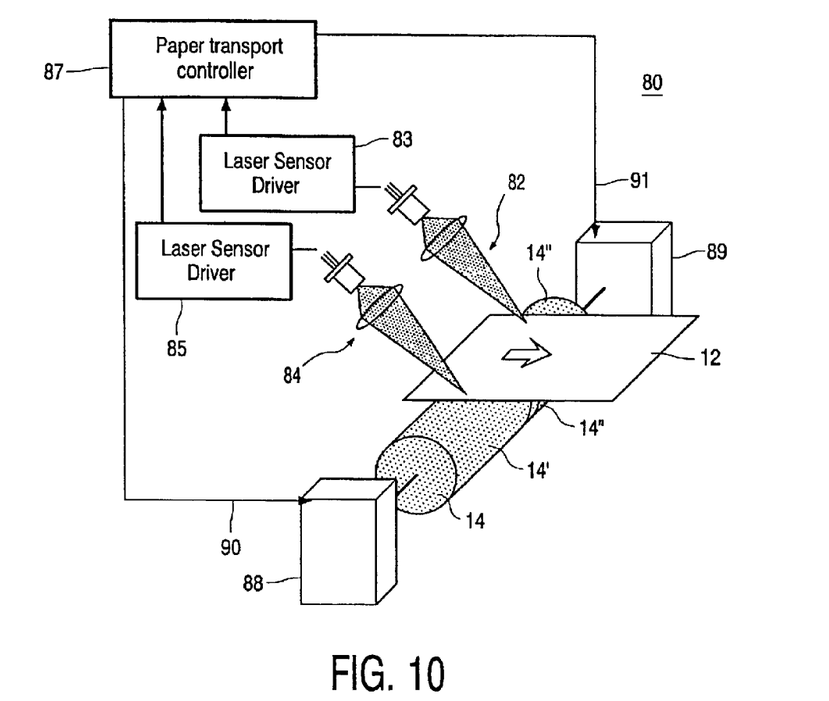
FIG. 10 shows a sheet sensor for detecting oblique transportation of a sheet.

In a printer, a copier etceteras an unsymmetrical slippage of the paper over the roller may occur so that the sheet will be transported in an oblique way through the apparatus. The sheet sensor may be designed such that it allows detection of such slippage and correction of it. FIG. 10 shows an embodiment of such a sensor 80. This sensor comprises two sensor branches 82 and 84, each with their own electronic circuit 82 and 84, respectively. The axes of the sensor branches may be at the same angle with respect to the normal on the sheet and these axes point to different sides of the sheets. Each of the electronic circuits 82,84 supplies a drive signal to the associated diode laser and process the detector signal of the respective branch to a signal representing the amount and direction of movement of the sheet area under the respective branch. The signals of the circuits 82 and 84 are supplied to a paper, or sheet, transport-controlling circuit wherein the signals are compared with each other. If the signals are the same, the left-hand and right-hand portions, in FIG. 10 the upper and lower portion, of the sheet move at the same velocity and in the same direction. If the signals are not the same, the movement of the left-hand portion is different from that of the right-hand portion. To correct for the latter, unwanted, movement, the roller 14 is divided in two sub-rollers 14', 14" and for each sub-roller a separate actuator 88, 89, comprising a motor, is provided. These actuators are controlled by signals, including correction signals 90,91 from the paper transport controlling circuit 87.

According to a further aspect, which is important in practice, the information about oblique movement of the paper obtained with the two sensor branches of FIG. 10 can be used to correct by means of the print head. The signals from the branches 82,83 and 84,85 are then supplied to the electronic circuit of the print head, which circuit determines at which moment, thus at which position of the moving paper, an ink dot will be ejected and projected on the paper. Adapting the moments of ejection of ink dots by the print head to the degree of obliqueness of the paper movement allows printing lines, which are perpendicular to the sides of the paper also when the paper moves obliquely.

Figure 11:
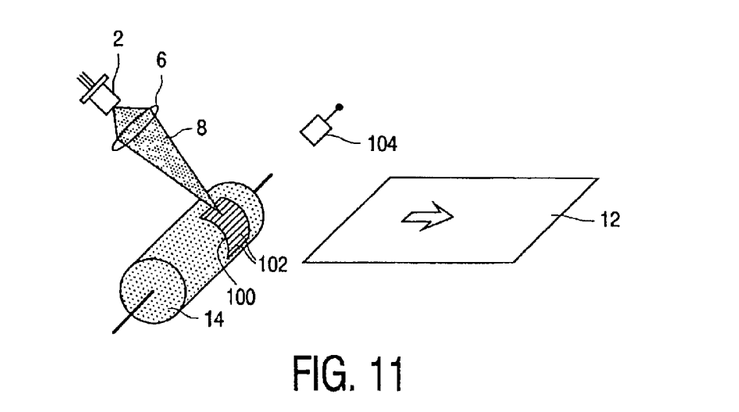
FIG. 11 shows a sheet sensor with self-calibration.

Diode lasers to be used in the sheet sensor of the present invention may emit at different wavelengths, even if they stem from the same manufacturing batch. Moreover, the wavelength of a diode laser may shift due to aging and temperature shift. For precise measurement is advisable to calibrate the sensor. According to another aspect of the invention such a calibration is carried out in a simple way and automatically, by providing the sheet roller of the apparatus wherein the sensor is used with a calibration mark 100 and scanning this mark with the sheet sensor, as shown in FIG. 11. The calibration mark comprises a number of strips 102 at mutually equal distance and showing another reflectivity than their surrounding on the roller surface. For performing the calibration measurement, the roller is rotated in absence of a sheet and at the nominal velocity, i.e. the velocity required for transporting a sheet at the required velocity, and the sensor is switched on. The strips 102, which pass through the beam, now modulate the amplitude of the radiation beam reflected by the roller surface. The period of this modulation is compared with a reference period that should be measured for the rotation velocity and the distance between the strips of the calibration mark used. If the measured period is different from the reference period the diode laser can be adapted, for example by adapting its drive current, such that the two periods become equal. For the calibration measurement the sheet sensor should be provided with means for measuring reflection differences. This means may be constituted by a separate photodiode 104, which receives measuring beam radiation reflected in a direction different from that of the direction towards the diode laser. This means may also be constituted by electronic means for measuring differences in the amplitudes of the undulations in the signal from the laser/diode unit, thus the self-mixing signal, which occur during scanning of the calibration mark. These undulations are similar to those of FIGS. 3a and 3b, but their amplitude changes when a strip 102 passes through the measuring beam 8.

Calibration may also be carried out by using the parameters of the laser cavity. The temperature, and therewith the wavelength—, behaviour of a diode laser can be determined by measuring its current versus voltage characteristic. Then it is also known how the wavelength changes if radiation, which is reflected by a surface at a given, standard, distance, re-enters the laser cavity. It is thus possible to determine a deviation of a sheet sensor by measuring the standard distance by means of this sensor. Adapting, for example the electrical current through the laser cavity can eliminate this deviation. However, the calibration procedure with the calibration mark on the roller is preferred because it is more precise and reliable. The calibration procedure can be carried out at regular time intervals. As this procedure is not time-consuming, it can, for example, be carried out each time before a sheet is going to be transported or after a sheet has been transported, which allows a very precise paper feed control.

The sheet sensor may be provided with focus control means to keep the focus of the measuring beam on the sheet stationary. To measure whether the actual focus state is equal to the required focus, focus detection methods, which per se are well-known may be used. Such methods are used, for example in optical heads for reading and writing optical record carriers, like a Compact Disc (CD) and derivatives thereof. Such optical heads are compact and low-cost and the focussing techniques used therein can also be used with great advantage in the present sheet sensor.

One of the focus detection methods that can be used in this sensor is the so called astigmatic method. According to this method a portion of the measuring beam reflected by the sheet and passed by the lens 6 is split-off and directed to a separate detector, for example by a beam splitter arranged between the diode laser and the lens 6. By means of, for example, a cylinder lens the split-off beam is made astigmatic, which means that this beam has two mutually perpendicular focal lines, instead of one focal point. The separate detector is arranged halfway between the focal lines and this detector is a so-called quadrant detector, i.e. it comprises four detector elements arranged in different quadrants. If the measuring beam is correctly focussed on the sheet the radiation spot formed on the detector is round and the four detection elements all receive the same amount of radiation. If a focus error occurs the said spot will have an elliptical shape, whereby the long axis of the ellipse is in one of two, mutually perpendicular, directions depending on the sign of the focus error. By appropriate combining the signals of the four detector elements the shape of the spot formed on the detector, and thus the amount and sign of the focus error, can be determined. Details about the astigmatic focus error detection method can be found in a/o U.S. Pat. No. 4,023,033 wherein the use of this method in a device for reading an optical record carrier is described.

Another focus error detection method is known as the (double) Foucault method. According to this method. According to this method a portion of the measuring beam reflected by the sheet and passed by the lens 6 is split-off and directed to a separate detector, for example by a beam splitter arranged between the diode laser and the lens 6. By means of, for example a prism or wedge the split-off beam is split in two sub-beams, which form two spots in the plane of the separate detector. This detector comprises two pairs of detection elements arranged in series and such that, in case of a correct focus of the measuring beam on the sheet, the spots are symmetrically positioned with respect to the corresponding detector pair. If the focus is not correct, the spots will be shifted across the corresponding detector pairs. By an appropriate combination of the output signals of the detection elements a focus error signal is obtained. Details about the Foucault focus error detection method can be found in a/o U.S. Pat. No. 4,233,502, wherein the use of this method in a device for reading an optical record carrier is described.

A focus error signal may also be deduced from the amplitude of the undulations of the self-mixing signal. If the measuring beam is optimally focused on the sheet, the undulations show maximum amplitude. If deviations from optimum focus occur, the undulations will show smaller amplitudes. By comparing the actual amplitude of the undulations with a reference, representing optimum focus, a focus error can be determined.

Figure 12:
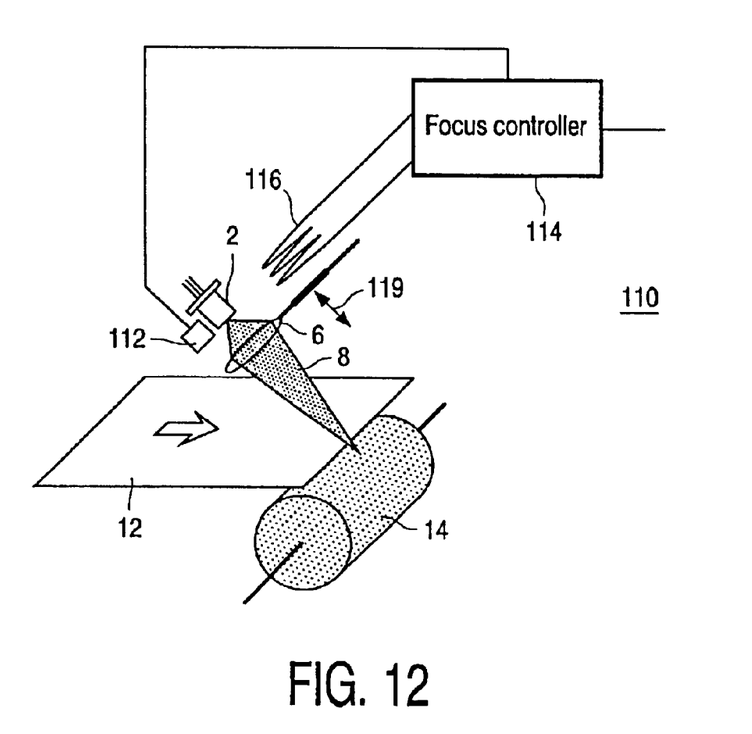
FIG. 12 shows a sheet sensor with focus control.

FIG. 12 shows an embodiment of a sheet sensor provided with focus error detection capability, either in accordance with one of the two methods discussed herein above or in accordance with another focus error detection method known, for example from the field of optical recording. In this Fig., block 112 comprises the components by means of which the focus error signal is generated, thus in case of the stigmatic method, the astigmatic element and the four quadrant detector and in case of the Foucault method, a prism and the four detector elements arranged in series. The focus error information from this block can be supplied to a focus controller 114, by means of which the focus can be corrected. For example, an electrical current through a coil 116, by means of which the lens 6 can be moved up-and downwards as indicated by arrow 119, van be controlled in a way well-known from, for example the field of optical recording. A sheet sensor with focus control allows improved sheet movement measurement.

Another essential advantage of a sheet sensor with focus error detection is the capability to determine the paper or sheet thickness. To that end the sensor is switched on before the paper reaches the roller 12 and a first optimum focus, i.e. optimum with respect to the roller surface of the measuring beam is set by means of focus servo loop 112,114,116. As soon as the paper is placed on the roller and reaches the measuring beam, the amplitude of the self-mixing signal changes, due to the difference in reflection and/or scattering of the roller and the paper. Then a second optimum focus, i.e. optimum with respect to the paper, of the measuring beam is set by means of the focus servo loop 112,114,116. The difference between the first and second optimum focus represents the thickness of the paper. This difference may find concrete shape in different positions of the lens 6 along the measuring beam axis.

An apparatus wherein printing process is performed and which has the capability to measure the thickness of the print medium allows automatic adaptation of the printing process to the thickness of the print medium, for example paper, and thus automatic optimization of the printing process. A sheet sensor according to the invention may also be used for measuring only sheet thickness, whilst another similar sensor or other means may be used to measure movement of the sheet.

Figure 13:
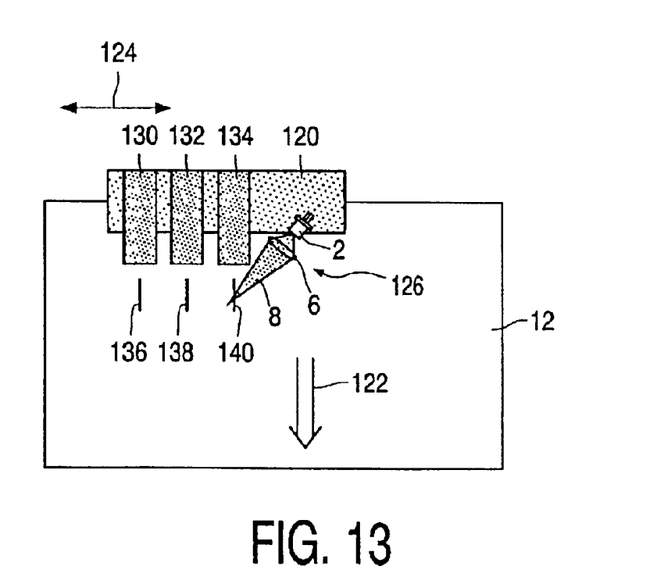
FIG. 13 shows a sheet sensor for monitoring ink spots.

A sheet sensor according to the present invention can also be used in a printing apparatus for measuring the movement of the print head relative to the print medium, for example a paper sheet, in a direction transverse to the direction of sheet transportation. This application is schematically shown in FIG. 13. In this FIG., 14 is a sheet of paper to be printed, which moves in the direction of the arrow 122. The print head is denoted by numeral 120 ans moves in the direction of the arrow 124 during the print process. A sheet sensor 126, discussed herein above and comprising a laser/diode unit 2, a lens 6 and a measuring beam 8, is fixed to or integrated in the print head. By means of this sensor the movement of the print head 120 relative to the paper sheet 14 in the direction 124 can be determined in the way as described herein above for the movement of the paper sheet in the direction 122. This allows a more accurate positioning of the print head. If two such sheet sensors, arranged at opposite ends of the print head, are used it becomes possible to determine whether the print head actually moves in the direction of the arrow 124, or in a direction at an angle with this arrow. This measurement is similar to the measurement of oblique movement of the sheet discussed at the hand of FIG. 10.

The sensor 126 may also be used to control the print process, because it allows detection of a printed ink mark or dot, like ink dot 140. The reflectivity of such a dot is different from that of the paper and the dot boundary causes diffraction. This allows establishing of the presence of the dot and determining its size, by measuring the amplitude of the reflected radiation during movement of the print head in the direction of the arrow 124. Thus it becomes possible to establish, for example during printing of a line, whether in a preceding line a dot has been printed on the right position and has the right size. This procedure can be performed for a print head with a black cartridge and/or a colour cartridge. FIG. 13 shows a colour cartridge with a green, red and blue ink reservoirs 130,132 and 134, respectively, by means of which a green dot 136, a red dot 139 and a blue dot 140 have been printed. In case of a colour cartridge, three sheet sensors similar to sensor 120 can be used, which are made sensitive to green, red and blue radiation respectively. By means of such a threefold sensor it can also be established whether a printed spot has the required colour.

An important practical aspect of a dot-measuring sensor according to the present invention is that the annoying and time-consuming calibration procedure, which should be carried out every time a new ink cartridge has been installed, can be automated and speed-up.

In the embodiments of the preceding Figs., the components of the sheet sensor are separate elements. This allows using empty positions within existing apparatus to build in the sheet sensor. However it is also possible to accommodate the sensor components in one module and to build in this module in the apparatus. The number of diode lasers and measuring beams and their mutual orientation in such a module depends on the required measuring functions to be performed. In the module a single lens can be used for all measuring beams. These beams leave the module via a common window in the module housing.

From an optical point of view, the dimensions of the optical module may be very small. The size of the input device is mainly determined by the amount of electronics that has to be incorporated in the device and by the aspect of easy mass manufacturing. In practical embodiments, the window has a size of some mm squared. Because of the measuring principle used in this device, its components need not be aligned very accurately, which is a great advantage for mass production.

Figure 14A:
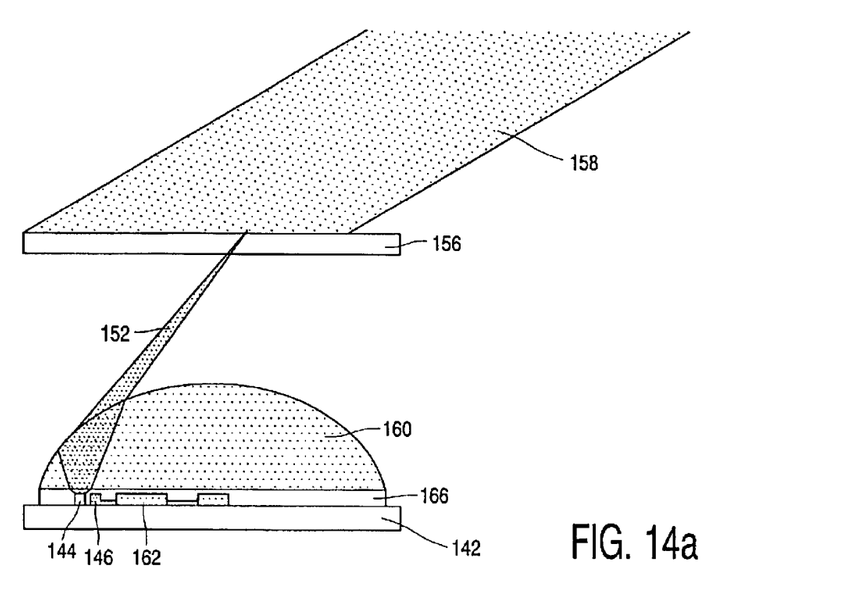
FIGS. 14a and 14b show a first embodiment of a sheet sensor module.
Figure 14B:
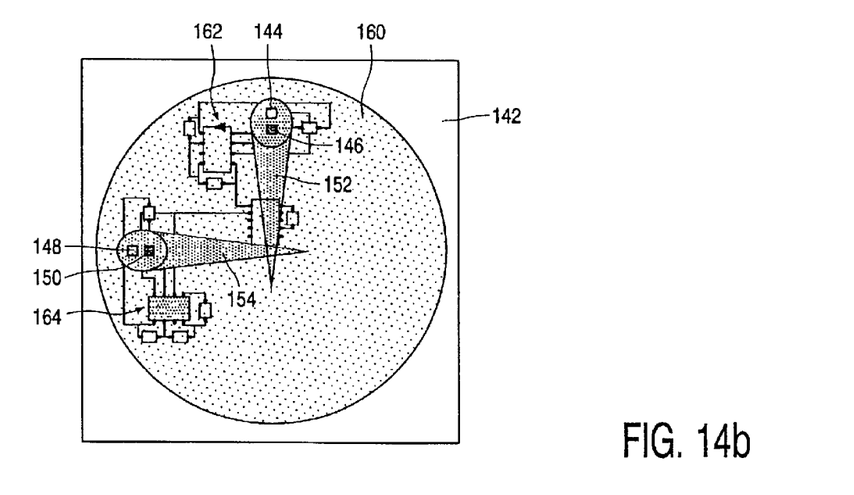

FIG. 14*a* shows a diagrammatic cross-section of a first embodiment of the sensor module. This module comprises at its lower side a base plate 142, which is a carrier for the diode lasers, in this embodiment lasers of the type VCSEL, and the detectors, i.e. photo diodes. In FIG. 14*a* only one diode laser 144 and its associated photo diode 146 is shown, but a second diode laser 148 and associated photo diode 150 may be provided on the base plate as shown in the FIG. 14*b* top view of the module. The diode lasers 144 and 148 emit measuring beams 152 and 154, respectively. At its upper side the module is provided with a transparent window 156, across which a sheet, for example of paper, 158 is moved. A lens 160, for example a plane-convex lens is arranged between the diode lasers and the window. This lens focuses the measuring beams 152 and 154 at or near the upper side of the window 156. As the diode lasers are arranged eccentrically with respect to the lens, the measuring beams passing through the window are skew beams, which have a component in the direction of movement of the sheet 158. The circuitry 162 and 164 for processing the signals of the photo diodes 146 and 150 has only an illustrative purpose and may be more or less conventional.

The lens 160 may be made of glass or a transparent plastic material, like polycarbonate (PC) or polymethyl methacrylate (PMMA). Such a lens can be fixed to the substrate, carrying the diode lasers, the photo diodes and processing circuitry, by means of a transparent glue layer 166, for example of epoxy.

It is assumed that the diode lasers 144 and 148 radiate in the vertical direction, so that these diode lasers may be of the VCSEL type. Such a diode laser can easily be placed on the base plate by means of a wire bounding technique.

Figure 15A:
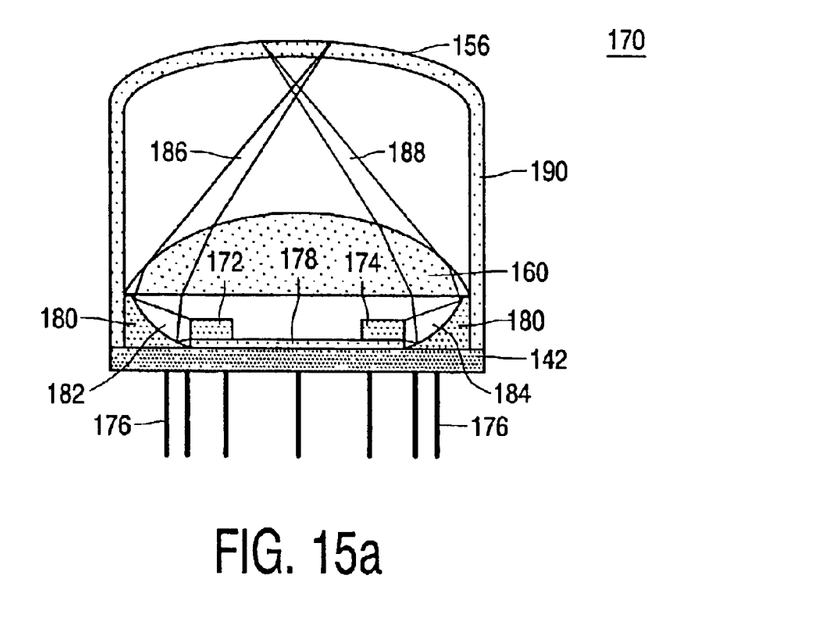
FIGS. 15a and 15b show a second embodiment of this module.
Figure 15B:
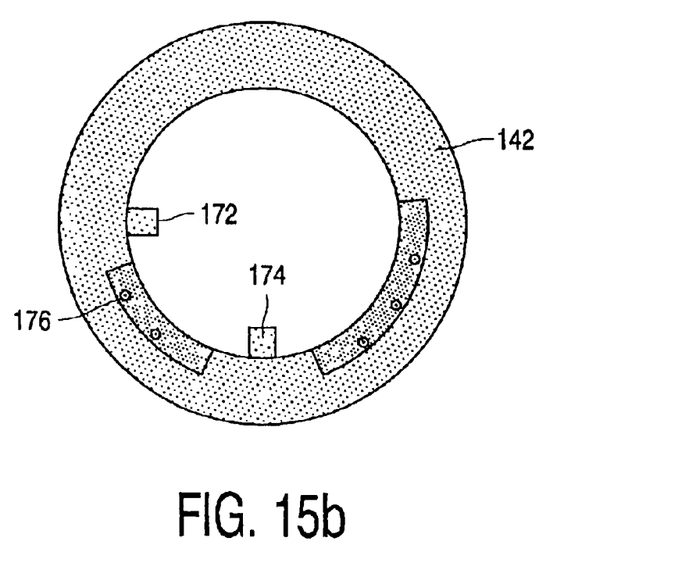

Currently, more conventional side emitting diode lasers, which have a horizontal cavity, are preferred because they are considerably cheaper. Such a diode laser can be mounted in such a way that it radiates in the vertical direction. For example, the laser can be mounted on a small table. It is, however, also possible to mount side-emitting diode lasers in such a way that they emit in the horizontal direction. FIG. 15*a* is a vertical cross-section of a second embodiment 170 of the sensor module, which embodiment is provided with such diode lasers 172 and 174. FIG. 15*b* is a top view of the lower part of this embodiment. Also this embodiment comprises a base, or housing, plate 142 from which electrical contact pins 176 protrude. This base plate has such heat-conduction that it can function as a cooling element for the diode lasers. The electronic circuitry, not shown in FIG. 15*a* and 15*b*, may be mounted on a layer 178 of silicon or another material, which layer forms a circuit board. Also the embodiment of FIGS. 14a and 14b may comprise such a layer. For each of the side emitting diode lasers 172 and 174 a reflecting member 180 is provided, which reflects the horizontally emitted beam 182 and 184 from the diode lasers in the vertical direction through the lens 160 towards the window 156. Preferably the reflecting elements have a spherical shape so that they have also some optical power and convert the incident diverging beam 182 and 184 into a less divergent, or a collimated, or even slightly converging, beams 186 and 188. The optical power of the lens 160 can then be smaller than that of the lens 1 in the embodiment of FIGS. 14a and 14b. Also in the embodiment of FIGS. 15a and 15b, the lens 160 may be a glass lens, but is preferably a plastic lens. A plastic lens is cheaper and lighter than a glass lens and is very suitable in this application because no stringent optical requirements are set to this lens. A cap 190, which is preferably made of plastics and is provided with the transparent window 156, forms together with the housing plate 142 the housing of the module. The two reflecting members 180 may be constituted by one plastics ring, which is covered by a reflecting coating. Said ring may form an integral part of the base plate 142. The input device then mainly consists of plastic material and is composed of only three constructional parts, which can easily be assembled. These parts are: the base plate 142, which is provided with the reflecting ring, the contact pins 176 and the diode lasers and associated photo diodes, the lens 160 and the cap 190 provided with the window 156.

Figure 16:
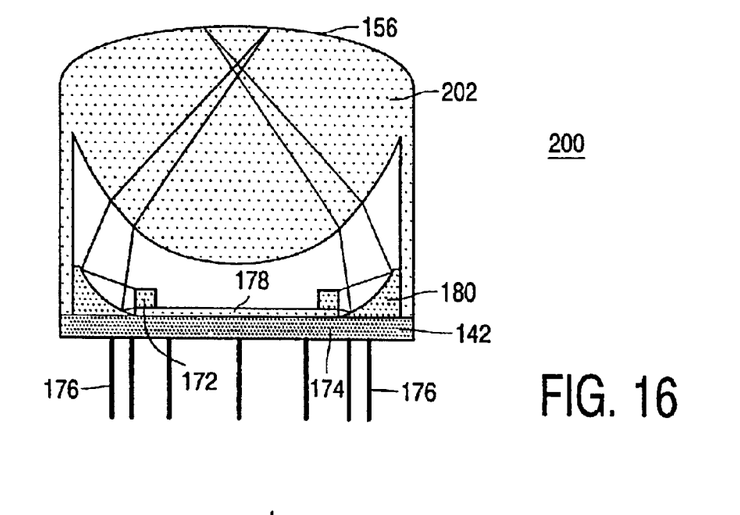
FIG. 16 shows a third embodiment of this module.

FIG. 16 shows a preferred embodiment 200 of the sensor module wherein a further integration of parts has been carried out. In this embodiment, the cap 190 and the lens 160 of the embodiment of FIG. 15a are replaced by a single plastic element 202 the lower side of which is curved towards the base plate. This curved surface has the same refractive effect on the illumination beams as the lens 16 in FIG. 15a. A top view of the lower part of the embodiment of FIG. 16 is not shown because this part is the same as that of FIGS. 15a and 15b. The embodiment shown in FIG. 16 is composed of only two constructional parts and is even easier to assemble than the embodiment shows in FIGS. 15a and 15b.

In the embodiments shown in FIGS. 14a, 15a and 16 the measuring beams are preferably focused in a plane remote from the outer surface of the window, so that these beam do not have a minimum cross-section at the outer surface of the widow. This provides the advantage that dust particles and scratches on this surface do not have a substantial influence on these beams. As these beam originate from different positions at the base plate level, they form measuring spots at different positions in the action plane, i.e. the plane where the measuring beams meet the sheet to be measured. As the measuring beams and their scattered radiation are sufficient spatially separated, cross talk between the different measuring beams is no problem in the sheet sensor of the present invention. If necessary, a residual crosstalk can be reduced by using diode lasers with slightly different wavelengths. For this purpose, a wavelength difference of a few nm is already sufficient.

Another possibility of eliminating crosstalk is, to use of a control drive for the diode lasers, which causes only one laser to be activated at any moment. A multiplexing driving circuit, which circuit alternately activates the different diode lasers, may constitute such a control drive. Such multiplexing circuit allows to monitor the changes in the measuring beams of two diode lasers by means of one detector, or photodiode, which is arranged within reach of each of the diode lasers and is used in a time sharing mode. An additional advantage of the embodiment with such a driving circuit is that the space needed for the circuitry and the electric power consumption of the device are reduced.

Figure 17A:
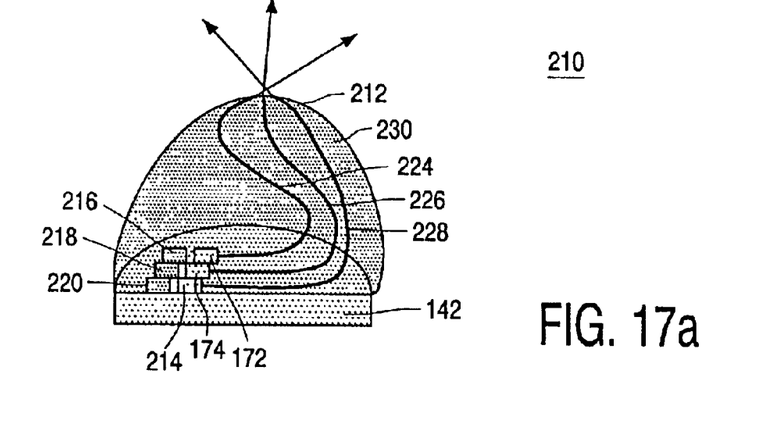
FIGS. 17a and 17b show a fourth embodiment of this module.
Figure 17B:
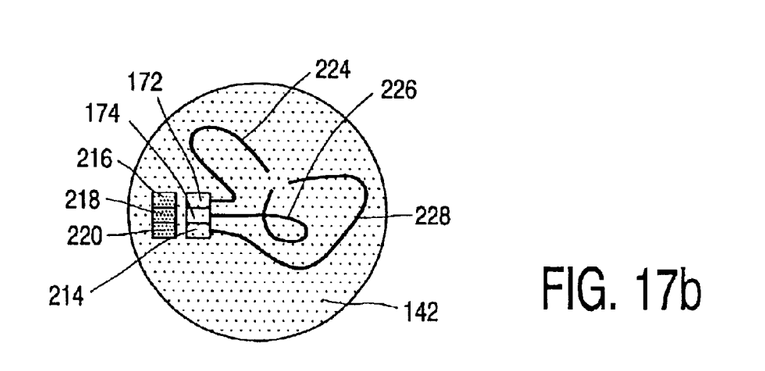

FIGS. 17a and 17b show an embodiment 210 of the sensor module wherein the measuring beams are guided to the window 212 by optical fibres. These Figs. demonstrate also that, if needed, the number of measuring beams can easily be enlarged. FIG. 17a is a vertical cross-section and FIG. 17b is a top view of this embodiment. The input ends of fibres 224, 226 and 228 are optically coupled to the diode lasers 172, 174 and 176, respectively, in a well-known way. All output ends of the fibres are located at the window of the module. The fibres may be embedded in a cap 230 of solid material, for example, epoxy or another transparent or non-transparent material. Each of these fibres forms an isolator for the radiation guided by this fibre, both for the measuring beam from the associated diode laser and the scattered radiation returning to this laser. As a consequence, the possibility of crosstalk between the different measuring beams axes is very small to nought. Other advantages of fibres are that they are flexible, which increases the design possibilities, and that they can transport the radiation over arbitrary distances so that the diode lasers and photodiodes can be arranged at quite remote distances from the window of the module. In the embodiment of FIGS. 17a and 17b, the diode lasers and associated photo diodes are arranged close together. These elements may be arranged in a separate compartment 232, as shown in FIG. 17a, which compartment may be of the same material as the cap or of another material.

Instead of fibres, other light guides may be used, for example, channels in a body of transparent or non-transparent material. Also in embodiments of the module wherein separate components are used, like the embodiments of FIGS. 1 and 8–13 fibres may be used to guide the measuring beams to the window and to guide scattered radiation to the photo diodes.

As the sheet sensor described herein above can be manufactured at low costs, it is very suitable to be implemented in mass consumer apparatus. Because of its very small size and light-weight, this sensor can easily be integrated in existing apparatus, thereby increasing the capabilities of these apparatus without substantially increasing their costs and weight and without changing their original design. The sheet sensor may be used in any apparatus wherein a sheet is transported through the apparatus to be processed thereby and wherein the movement of the sheet should monitored precisely. Such processing includes reading information such as data graphics etceteras present on the sheet, writing or printing information of such information on a sheet, precisely threatening the surface of a sheet or well-defined areas of such a surface, placing small components on a sheet or film, etceteras. The envisaged apparatus is a black and white or colour ink-jet or laser printer, a facsimile apparatus, a copier, a flat bed scanner, a component placement apparatus, a mechanical or chemical processing apparatus, and etceteras. These apparatus are known per se and need not to be described here. The apparatus wherein the invention is implemented differ from known apparatus in that the movement of the sheet can be monitored precisely with relatively simple means, which require very little space. From the above it will be clear that the sheet may be a paper sheet, but also a sheet of other material. The measuring method and the sensor do not require a high reflectivity for such a sheet.

What is claimed is:

1. A method of measuring movement of a material sheet and a sheet sensor relative to each other along a measuring axis, the method comprising:

illuminating the material sheet with a measuring laser beam emitted from a laser cavity of the sheet sensor;

measuring a change in an operation of the laser cavity in response to at least a portion of the measuring laser beam reflecting from the material sheet and re-entering the laser cavity;

converting the measured change in the operation of the laser cavity into an electrical signal representative of the movement of the material sheet and the sheet sensor relative to each other along the measuring axis; and controlling the movement of the material sheet and the sheet sensor relative to each other along the measuring axis as a function of the electrical signal.

2. The method of claim 1, wherein the electrical signal is indicative of at least one of an amount and a direction of the movement of the material sheet and the sheet sensor relative to each other along the measuring axis.

3. The method of claim 1, further comprising:

supplying the laser cavity with a periodically varying electrical current to thereby illuminate the material sheet with a measuring laser beam emitted from a laser cavity of the sheet sensor, wherein, based a periodically varying electrical current, the electrical signal is indicative of at least one of an amount and a direction of the movement of the material sheet and the and the sheet sensor relative to each other along the measuring axis.

4. The method of claim 1, further comprising:

detecting a state of focus of the measuring leaser beam relative to the material sheet.

5. The method of claim 4, further comprising:

focusing the measuring leaser beam relative to the material sheet in dependence upon the detected state of focus.

6. The method of claim 1, further comprising:

determining a first optimum state of focus of the measuring laser beam relative to a surface of a sheet transporting means;

determining a second optimum state of focus of the measuring laser beam relative to a surface of the material sheet; and determining a thickness of the material sheet based on a difference between the first optimum state of focus and the second optimum state of focus.

7. The method of claim 1, further comprising:

detecting an oblique movement of the material sheet based on the electrical signal.

8. The method of claim 1, further comprising:

monitoring a printing process based on the electrical signal.

9. A system, comprising:

a sheet sensor;

means for illuminating a material sheet with a measuring laser beam emitted from a laser cavity of a sheet sensor;

means for measuring a change in an operation of the laser cavity in response to at least a portion of the measuring laser beam reflecting from the material sheet and re-entering the laser cavity; and means for conveying the measured changes in the operation of the laser cavity into an electrical signal representative of a movement of the material sheet and the sheet sensor relative to each other along the measuring axis, wherein the movement of the material sheet and the sheet sensor relative to each other along the measuring axis is controlled as a function of the electrical signal.

10. The system of claim 9, wherein the electrical signal is indicative of at least one of an amount and a direction of the movement of the material sheet and the and the sheet sensor relative to each other along the measuring axis.

11. The system of claim 9, further comprising:

means for detecting a state of focus of the measuring lesser beam relative to the material sheet.

12. The system of claim 11, further comprising:

means for focusing the measuring leaser beam relative to the material sheet in dependence upon the detected stare of focus.

13. The system of claim 9, further comprising:

means for determining a first optimum state of focus of the measuring laser beam relative to a surface of a sheet transporting means;

means for determining a second optimum state of focus of the measuring laser beam relative to a surface of the material sheet; and means for determining a thickness of the material sheet based on a difference between the first optimum state of focus and the second optimum state of focus.

14. The system of claim 9, further comprising:

means for detecting an oblique movement of the material sheet based on the electrical signal.

15. The system of claim 9, further comprising:

means for monitoring a printing process based on the electrical signal.

16. The system of claim 9, wherein the sheet sensor includes means for generating the measuring laser beam.

17. The system of claim 9, wherein the system is embodied in a printer.

18. The system of claim 9, wherein the system is embodied in a facsimile apparatus.

19. The system of claim 9, wherein the system is embodied in a copier.

20. The system of claim 9, wherein the system is embodied in a scanner.

* * * * *